B. WORTHINGTON.
COTTON PICKER.
APPLICATION FILED NOV. 26, 1910.

1,012,497.

Patented Dec. 19, 1911.
2 SHEETS—SHEET 1.

Witnesses

Inventor
Bruce Worthington
By
Attorney

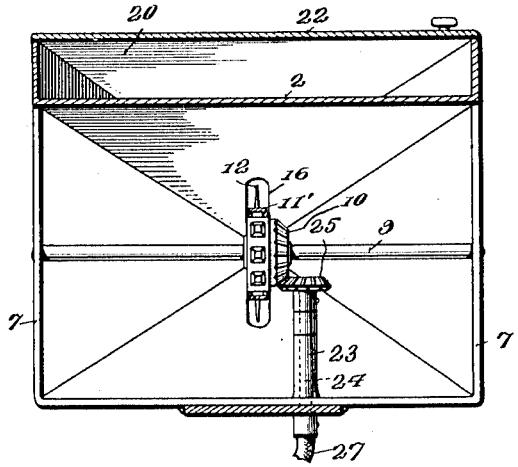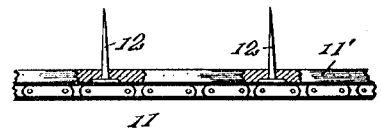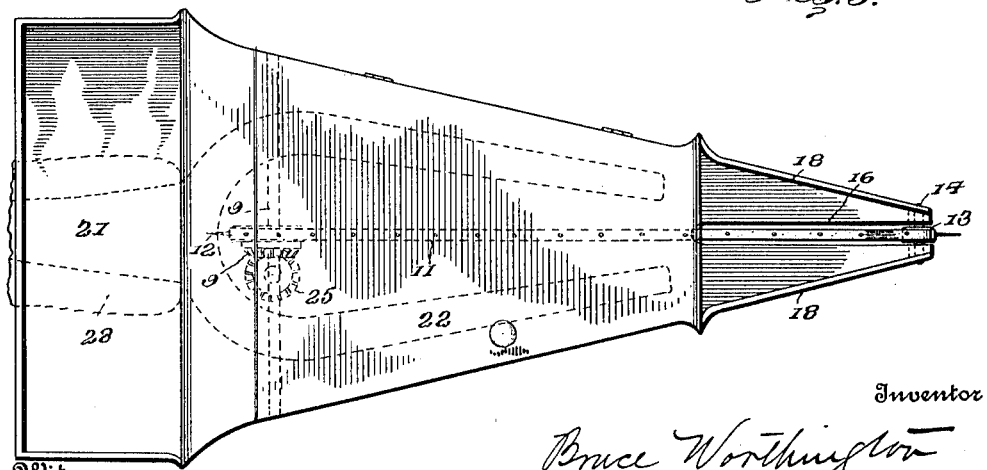

UNITED STATES PATENT OFFICE.

BRUCE WORTHINGTON, OF WINCHESTER, VIRGINIA, ASSIGNOR TO WORTHINGTON COTTON HARVESTER COMPANY, A CORPORATION OF DELAWARE.

COTTON-PICKER.

1,012,497.  Specification of Letters Patent.  Patented Dec. 19, 1911.

Application filed November 26, 1910. Serial No. 594,365.

*To all whom it may concern:*

Be it known that I, BRUCE WORTHINGTON, a citizen of the United States, residing at Winchester, in the county of Frederick and State of Virginia, have invented certain new and useful Improvements in Cotton-Pickers, of which the following is a specification.

This invention relates to a device for picking cotton.

One of the main difficulties in picking cotton with cotton pickers heretofore devised, is the difficulty of getting rid of the cotton as the same is picked, that is to say, conveying the same to a readily accessible point, where it can be removed from the picker or delivered in a suitable receptacle.

One of the primary objects of this invention is to provide a picker that will automatically convey cotton to a suitable receptacle readily accessible to the operator who can, from time to time, remove the accumulated cotton and make such disposition of it as may seem to him to be most suitable.

Another object of the invention is to provide a device that will embody such construction as will operate upon the cotton alone, completely stripping the same from the pods without carrying with it leaves or other undesirable things, and a picker that will operate upon what is known as "tight-bolls" with the same ease and efficiency as that obtaining in picking fuller, riper cotton.

A further object of the invention is to provide a light device of this character which may be readily handled by the operator, and of such construction that little power will be required to drive its driven parts and one which may be very rapidly manipulated by the operator to give that freedom in movement necessary in the efficient picking of cotton, all of the details of which construction, enabling me to attain these objects, will be described in the following specification.

Figure 1:
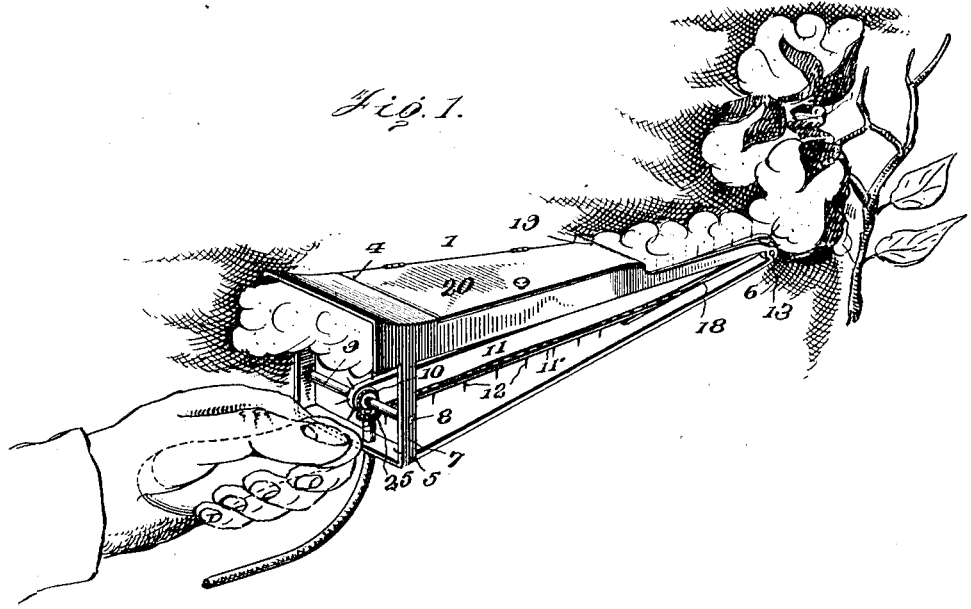
Figure 2:
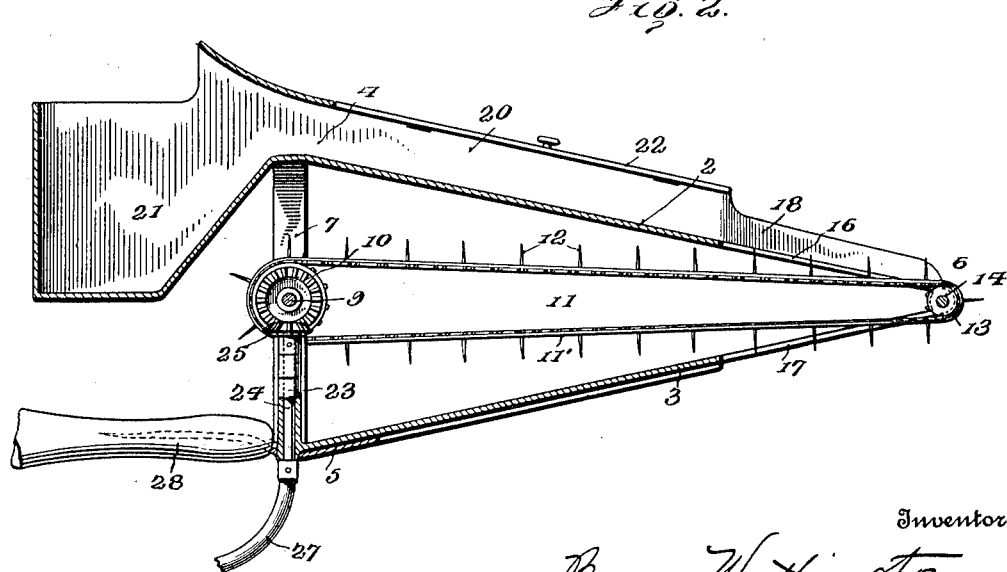

In the drawings: Figure 1 is a perspective view of the device with the cotton receptacle broken away; Fig. 2 is a longitudinal section of the picker; Fig. 3 is a rear elevation and partial section; Fig. 4 is a plan view; and Fig. 5 is a detail view of a section of the belt.

Referring to the drawings, the numeral 1 designates the frame of the picker. This is constituted in the main, by a top plate 2 and a bottom plate 3, which plates are preferably constructed of metal, both on account of the strength of such material, and the fact that the metallic surface will wear very smooth and especially the surface upon the top plate, facilitating the operation of the picker, as will become more apparent later on.

The plates 2 and 3 are preferably triangular in shape, thus presenting at the inner end of the picker, widened ends 4 and 5, and at the forward part of the picker, a pointed end 6. The inner ends of the picker are spaced apart and rigidly held together by oppositely disposed standards 7 secured in any suitable way to the under side of the plate 2 and the upper side of the plate 3. Journaled in bearings 8 in these standards is a transverse shaft 9, which carries a sprocket wheel 10 upon which runs an endless belt 11 provided at intervals with picker pins 12. This belt, at the forward end of the picker runs on a sprocket 13 mounted upon a very short shaft 14, mounted in suitable bearings 15 in the pointed end of the picker. The plates 2 and 3 are provided with elongated slots 16 and 17 in the upper and lower plates respectively. These slots are for the passage of the picker pins 12 which, in the operation of the picker disappear below the surface of the plate 2, at the end of the slot 16, withdrawing these from the cotton and depositing the same upon the inclined surface of the upper plate. The upper plate is provided with short upwardly extending flanges 18 which form a sort of a trough for properly guiding the cotton toward the rear end or the operator end of the picker. These flanges extend to the slightly flaring mouth 19 of a chute 20, through which the cotton is forced. The inner end of this chute is preferably widened and deepened to form a temporary storage receptacle 21 conveniently located, so that the operator may, from time to time, reach the receptacle and remove the accumulated cotton therefrom and place the same in larger receptacles which may be arranged therefor, as the exigencies of the case may require. I provide the top of the chute 20 with a hinged cover 22, thus making the interior of the chute accessible at all times to readily remedy any difficulties that may occur from clogging, should such a thing occur.

The numeral 23 designates a short vertical sleeve rigidly mounted on the bottom plate 3 of the picker, at the rear end thereof, through which passes a short vertical shaft 24 having mounted on the upper end thereof a beveled gear wheel 25 in mesh with a similar wheel keyed to the horizontal driving shaft 9. To the lower end of the shaft 24 is attached preferably a flexible driving shaft 27 which may extend to any suitable sort of power for driving the belt. Attached to the bottom plate is a handle 28 by which the operator may support the picker and conveniently manipulate it in all directions, during the operation of the device.

In order that the belt may be positively driven which is preferred, I preferably form the same of metallic links of usual construction adapted to engage the sprocket teeth. Attached to the metallic part of the belt is a flexible part 11′, preferably leather, of sufficient thickness to support the headed picker pins with sufficient rigidity to cause them to operate properly upon the cotton, as it is picked from the pod, but at the same time to permit them to yield slightly when meeting resistance. This resistance which they are intended to yield to, occurs adjacent to the open mouth of the chute 20, where the cotton, which has been picked, forces a portion of the cotton which has been previously picked, into the mouth of the chute, the action of the picker pins being in effect, to withdraw them slantingly from the cotton at this point, so that there will be no tendency on the part of the pins to carry any of the cotton through the slot 16 in the top of the picker.

In operation, motion is imparted to the driving shaft 9, and through the shaft to the belt 11, which bears the pins of the belt successively to a position radial to the shaft 14. These pins will completely strip the cotton from the pod into which the pointed end of the device has been extended, carrying the cotton toward the mouth of the chute and forcing the same therein by the succeeding mass of cotton which is constantly following upon the picker pins; thus a constant bulk of picked cotton will be forced from the pointed end of the picker, through the chute 20, where, from the rear end of said chute, it flows into the temporary receptacle provided therefor, from which it may be removed, from time to time, by the operator.

Having thus described my invention, what I claim is:

1. In a cotton picking tool, the combination with an endless carrier having a series of picker pins non-rotatably mounted thereon and adapted to be extended into the cotton to be picked, a member arranged above the carrier and extending rearwardly and away at an angle with relation to the path of movement of said carrier, said member having a stripping slot therein at its forward end through which the picker pins pass, whereby, due to the inclination of said member relative to the path of movement of the picker pins, the cotton is stripped from the pins as they pass toward the operator.

2. In a cotton picking tool, the combination of an endless carrier having a series of picker pins non-rotatably mounted thereon and adapted to be extended into the cotton to be picked, a member above the carrier and extending rearwardly and away at an angle relative to the path of movement of the carrier, stripping means carried by the forward end of said member through which the picker pins pass, whereby, due to the inclination of said member relative to the path of movement of the picker pins, the cotton is stripped from the pins as the carrier passes toward the operator.

3. In a cotton picking tool, the combination of an endless carrier having a series of picker pins non-rotatably mounted thereon and adapted to be extended into the cotton to be picked, a member above said carrier and extending rearwardly and away at an angle with relation to the path of movement of the carrier, said member having a stripping slot in its forward end through which the picker pins pass in their movement toward the rear end of the picker, whereby, due to the inclination of said member relative to the path of movement of the picker pins, the cotton is stripped from said pins as they pass toward the operator, and a chute carried by said member through which the picked cotton is forced and guided toward the operator.

4. In a cotton picking tool, the combination of an endless carrier having a series of picker pins non-rotatably mounted thereon, sprocket wheels over which said carrier passes, means for driving said sprocket wheels and thereby the carrier, a member above the carrier and extending rearwardly and away with relation to the path of movement of the said carrier, said member having a stripping slot in its forward end, through which the picker pins pass, whereby, due to the inclination of said member relative to the path of movement of the picker pins, the picked cotton is stripped therefrom, as the picker pins move toward the operator, and means for directing the picked cotton toward the rear of the picker.

In testimony whereof I affix my signature in presence of two witnesses.

BRUCE WORTHINGTON.

Witnesses:
ARTHUR L. BRYANT,
FRANK G. BRERETON.

Copies of this patent may be obtained for five cents each, by addressing the "Commissioner of Patents, Washington, D. C."